(12) United States Patent
Zhang et al.

(10) Patent No.: US 11,804,950 B2
(45) Date of Patent: *Oct. 31, 2023

(54) PARALLEL PROCESSING OF BLOCKCHAIN PROCEDURES

(71) Applicant: International Business Machines Corporation, Armonk, NY (US)

(72) Inventors: Qi Zhang, West Harrison, NY (US); Petr Novotny, Mount Kisco, NY (US); Lei Yu, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,160

(22) Filed: Dec. 6, 2022

(65) Prior Publication Data

US 2023/0101685 A1   Mar. 30, 2023

Related U.S. Application Data

(63) Continuation of application No. 16/941,722, filed on Jul. 29, 2020, now Pat. No. 11,563,559.

(51) Int. Cl.
| | |
|---|---|
| *H04L 9/06* | (2006.01) |
| *G06F 9/46* | (2006.01) |
| *G06F 9/54* | (2006.01) |
| *G06F 12/0891* | (2016.01) |
| *H04L 9/32* | (2006.01) |
| *H04L 9/00* | (2022.01) |

(52) U.S. Cl.
CPC ............ *H04L 9/0637* (2013.01); *G06F 9/466* (2013.01); *G06F 9/546* (2013.01); *G06F 12/0891* (2013.01); *H04L 9/3297* (2013.01); *H04L 9/50* (2022.05)

(58) Field of Classification Search
CPC ....... H04L 9/0637; H04L 9/3297; H04L 9/50; H04L 63/12; H04L 9/3239; G06F 9/466; G06F 9/546; G06F 12/0891; G06F 9/5066; G06F 2209/5017
See application file for complete search history.

(56) References Cited

U.S. PATENT DOCUMENTS

| | | | |
|---|---|---|---|
| 9,104,526 | B2 | 8/2015 | Jeon |
| 9,207,966 | B2 | 12/2015 | Slaviček |
| 10,225,076 | B2 | 3/2019 | Leng |
| 10,255,108 | B2 | 4/2019 | Dillenberger |

(Continued)

OTHER PUBLICATIONS

List of IBM Patents or Patent Applications Treated as Related, Dec. 6, 2022, 2 pgs.
Manevich et al.; "Poster: Service Discovery for Hyperledger Fabric", DEBS'18 12th ACM DEBS International Conference on, pp. 226-229, Jun. 2018.

(Continued)

*Primary Examiner* — Carl G Colin
*Assistant Examiner* — Andrew Suh
(74) *Attorney, Agent, or Firm* — Jared C. Chaney

(57) ABSTRACT

A client computer may split a process into sub-processes, send each sub-processes to a different group of peers in a blockchain network, wherein each group has at least one peer from each essential organization in the blockchain network, receive processed sub-transactions from the peers in the blockchain network, validate each sub-transaction, and validate the transaction based on the validation of all sub-transactions, wherein all sub-transaction must be valid for the transaction to be valid.

20 Claims, 15 Drawing Sheets

(56) References Cited

U.S. PATENT DOCUMENTS

| | | | |
|---|---|---|---|
| 10,489,787 B2 | 11/2019 | Sheard | |
| 10,579,424 B2* | 3/2020 | Goel | H04L 9/3297 |
| 2015/0161598 A1 | 6/2015 | Gale | |
| 2019/0171478 A1 | 6/2019 | Jenkinson | |
| 2019/0278852 A1 | 9/2019 | Jayachandran | |
| 2019/0354968 A1 | 11/2019 | Sato | |
| 2019/0362361 A1 | 11/2019 | Irazabal | |
| 2019/0384627 A1* | 12/2019 | De Caro | G06Q 20/223 |
| 2020/0044824 A1 | 2/2020 | Xie | |
| 2020/0074424 A1* | 3/2020 | Motylinski | G06Q 20/3678 |
| 2020/0396283 A1* | 12/2020 | Chakraborty | H04L 9/0618 |
| 2022/0038257 A1 | 2/2022 | Zhang | |

OTHER PUBLICATIONS

Mell et al.; "The NIST Definition of Cloud Computing", Recommendations of the National Institute of Standards and Technology, U.S. Department of Commerce, Special Publication 800-145, Sep. 2011, 7 Pages.

Ruan et al.; "A Transactional Perspective on Execute-Order-Validate Blockchains", Cornell University Library, arXiv:2003.10064v1, pp. 1-19, Mar. 23, 2020.

Sukhwani et al.; "Performance Modeling of Hyperledger Fabric (Permissioned Blockchain Network)", 17th NCA IEEE International Symposium on, pp. 1-10, Nov. 1-3, 2018.

Thakkar et al.; "Performance Benchmarking and Optimizing Hyperledger Fabric Blockchain Platform", 26th Mascots IEEE Inter. Symposium on, pp. 264-276, Sep. 25-28, 2018.

* cited by examiner

PARALLEL PROCESSING OF BLOCKCHAIN PROCEDURES

BACKGROUND

The present disclosure relates generally to the field of blockchain processing, and more specifically to improvements of blockchain processing time.

Blockchains offer immutability of data by replicating data across all nodes of a network. In order to be able to validate the blockchain, nodes generally require access to the complete history of actions. A complete history of actions is typically listed on the chain and is visible for all participants.

SUMMARY

Embodiments of the present disclosure include a method, system, and computer program product for parallel processing of blockchain procedures.

Some embodiments of the present disclosure can be illustrated by a method comprising, sending, by the processor, each sub-transaction to a different group of peers in a blockchain network, wherein each group has at least one peer from each essential organization in the blockchain network, receiving, by the processor, processed sub-transactions from the peers in the blockchain network, validating each sub-transaction, and validating the transaction based on the validation of all sub-transactions, wherein all sub-transaction must be valid for the transaction to be valid.

Some embodiments of the present disclosure can also be illustrated by a system comprising a processor, and a memory in communication with the processor, the memory containing program instructions that, when executed by the processor, are configured to cause the processor to perform a method, the method comprising split a transaction into two or more sub-transactions, send each sub-transaction to a different group of peers in a blockchain network, wherein each group has at least one peer from each essential organization in the blockchain network, receive processed sub-transactions from the peers in the blockchain network, validating each sub-transaction, and validating the transaction based on the validation of all sub-transactions, wherein all sub-transaction must be valid for the transaction to be valid.

Some embodiments of the present disclosure can also be illustrated by a computer program product comprising a computer readable storage medium having program instructions embodied therewith, the program instructions executable with a processor, in a node of a blockchain network, to cause the processors to perform a function, the function comprising splitting, by the processor, a transaction into sub-transactions, sending, by the processor, each sub-transaction to a different group of peers in a blockchain network, wherein each group has at least one peer from each essential organization in the blockchain network, receiving, by the processor, processed sub-transactions from the peers in the blockchain network, validating each sub-transaction, and validating the transaction based on the validation of all sub-transactions, wherein all sub-transaction must be valid for the transaction to be valid.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
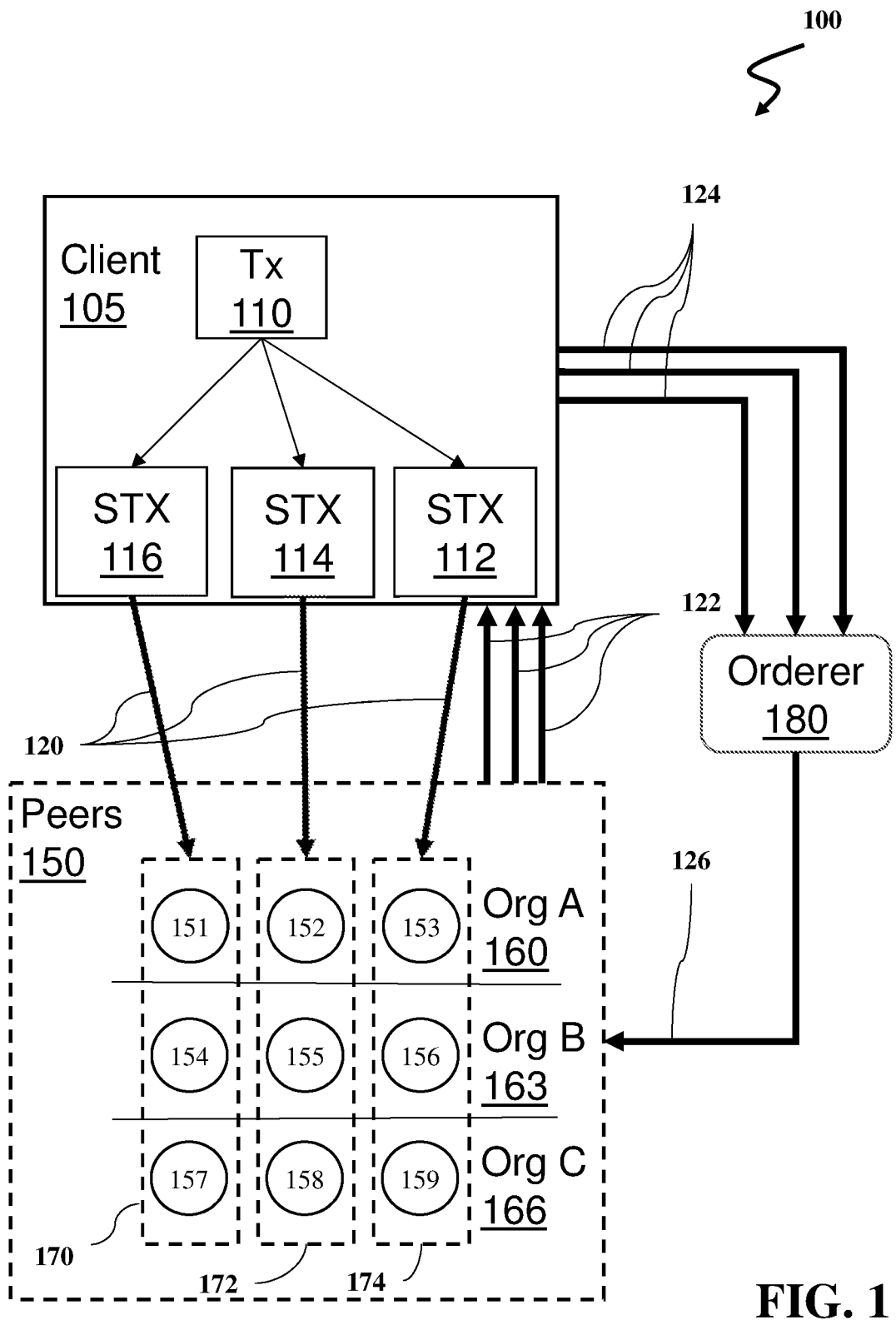
FIG. 1 illustrates a blockchain system diagram with a parallel flow for parallel processing of blockchain procedures according to example embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of blockchain processing, and more specifically to improvements of blockchain processing time.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that utilize blockchain (specifically, Hyperledger Fabric) channels, and smart contracts that implement logic based on a non-interactive zero knowledge proof.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal, but which do not fully trust one another, such as businesses that exchange funds, goods, information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions and maintain a state and a copy of the ledger of blockchain transactions. Peers can also have the role of an endorser, although it is not a requirement. An ordering-service-node, block generator, or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiments, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiments, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method, system, and computer program product for parallel processing of blockchain procedures. The exemplary embodiments solve the issues of reliability, time, and trust by extending features of a database such as immutability, digital signatures, and being a single source of truth. The exemplary embodiments provide a solution for excess processing of blockchain procedures (e.g. transactions) on blockchain.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for parallel processing of blockchain procedures. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that it improves the functionality of a computing system by implementing a method for processing a private transaction in a blockchain network. Through the blockchain system described herein, a computing system (or a processor in the computing system) can perform functionality for private transaction processing utilizing blockchain networks by providing access to capabilities such as distributed ledger, peers, encryption technologies, MSP, event handling, etc. Also, the blockchain enables systems to create a business network and make any users or organizations on-board for participation. As such, the blockchain is not just a database. The blockchain comes with capabilities to create a network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

A procedure (e.g., a transaction) is usually executed by multiple peers in a blockchain. Each peer executes the same transaction on the same data. Multiple peers are required to ensure the reliability of transaction execution results by cross checking each other. The execution of a transaction is considered successful when all the endorsing peers executing this transaction reach a consensus. The result is appropriately signed by each peer and matched to other peers.

However, this execution model can be resource consuming, especially when a transaction needs to be endorsed by a large number of peers and/or a transaction needs to work on a large amount of data. Take, for example, a transaction of "which day in the past 3 years had the most items shipped"? In a traditional system, each peer needs to execute the whole transaction, which takes a significant time to finish when the transaction is expensive. Expensive here means that the transaction may require the utilization of a significant amount of resources. For example, a transaction that requires processing of large data sets may be considered expensive by an organization. This issue is exacerbated when a blockchain has to process multiple transactions that have to be executed by multiple individual peers.

This leads to the issue of how to improve the execution efficiency of such expensive transactions, while still preserving the reliability such that the execution behavior of normal (non-expensive) transactions is not affected. In some embodiments, a method is provided for dividing transactions into sub-transactions and sending each sub-transaction to a different group of peers.

In some embodiments, by processing the sub-transactions by groups of peers rather than the blockchain as a whole, the transactions (from which the sub-transactions are derived) maintain the properties that are inherent in blockchain and not present in a traditional database, while streamlining the processing of the transactions. Some of the benefits of a blockchain that are not part of a traditional database but are inherent to blockchain include, but are not limited to, an immutable ledger, smart contracts, security, privacy, decentralization, consensus, endorsement, and accessibility. More details of these benefits and how they are realized in blockchain are discussed above. According to various aspects, the system described herein has benefits over a traditional system due to immutable accountability, security, privacy, permitted decentralization, availability of smart contracts, endorsements and accessibility that are inherent and unique to blockchain. In some embodiments of the present disclosures, these benefits of the overall blockchain system may be applied to the sub-transactions on an individual basis. In other words, the blockchain inherent features provide unique benefits for efficient implementation of parallel processing that may not be present in a traditional system where a job or process may be split up for two or more processors to complete tangentially.

Referring now to FIG. 1, illustrated is an example system 100 for parallel processing of blockchain procedures, in accordance with embodiments of the present disclosure.

In some embodiments, client 105 may divide a transaction (TX) into two or more sub-transactions. As depicted, client 105 divides transaction 110 into three sub-transactions (STX) 112, 114, and 116. For example, Client 105 may divide the transaction:

Transaction (TX 110): which day in year 2017-2019 had the most items shipped? (tx_id:1, op:max)

into three sub-transactions:

Sub-transactions (STX 112): which day in year 2017 had the most items shipped? (tx_id:1, stx_id:1, total:3, group 1)

Sub-transactions (STX 114): which day in year 2018 had the most items shipped? (tx_id:1, stx_id:2, total:3, group 2)

Sub-transactions (STX 116): which day in year 2019 had the most items shipped? (tx_id:1, stx_id:3, total:3, group 3).

In some embodiments, the sub-transactions may have metadata regarding the transaction, and the sub-transactions such as a transaction identification (id), a sub-transaction id, a designated peer group (see below), a total number of sub-transactions, etc. For example, the metadata for STX 112 may be (tx_id:1, stx_id:1, total:3, group 1) and the metadata for STX 114 may be (tx_id:1, stx_id:2, total:3, group 2), where tx_id is the transaction id number, stx_id is the sub-transaction id number, total is the total number of sub-transactions, and group is the group of peers that the client is sending the sub-transaction to. Other information and formats are possible for the metadata.

In some embodiments, client 105 may direct each sub-transaction to one or more groups 170, 172, or 174. For example, STX 116 may be sent to group 170, STX 114 may be sent to group 172, and STX 112 may be sent to group 174. In some embodiments, each group may consist of one or more peers of network peers 150. For example, group 170 may consist of peers 151, 154, and 157. Group 172 may consist of peers 152, 155, and 158. Group 174 may consist of peers 153, 156, and 159. Three groups are given as an example, some embodiments may have more groups, and some may have fewer. Likewise, each group may consist of more or fewer peers. In some embodiments, each sub-transaction may be complete before it is sent to the peers. For example, if a sub-transaction reads "which day in year 2019 had the most items shipped?" and all of the shipping data for 2019 has not been reported yet, the sub-transaction is not complete and the peers cannot endorse the sub-transaction until it is complete. Thus, the sub-transaction may be held until the data for 2019 has been reported.

In some embodiments, the sub transactions may provide additional information that may be used for processing the sub transactions into transactions. For example, if the answer to the sub-transaction in the previous example is simply, May 31, 2019, the system may not be able to compare this answer to the answer for other years since the number of items shipped on those days is not known. Therefore, the answer may also include a number of items shipped on May 31, 2019, so a comparison may be made to the days that had the most items shipped for other years. In some embodiments, the additional information is available on the ledger, so it may not need to be included with the answer. For example, the number of items shipped on May 31, 2019 is available on the ledger so a block generator combining the sub-transactions may look up the number of items shipped on May 31, 2019 when comparing it to the answer for other years.

In some embodiments, each group may have one or more nodes belonging to one or more organizations (e.g., Org A 160, Org B 163, and Org C 166). In some embodiments, each group may be required to have at least one node from each organization that is a part of the system 100. In some embodiments, each group may be required to have at least one node from each organization that is deemed essential. In some embodiments, system 100 may have rules dictating what an essential organization is. For example, organizations that were onboarded when system 100 was initiated may be deemed essential. In other embodiments, client 105 may dictate what an essential organization is. For example, if client 105, Org B 163, and Org C 166 are all associated with the same company, Org B 163 and Org C 166 may be deemed essential.

Each peer may process and validate the sub-transactions in a similar manner to a regular transaction. See FIG. 4A for detail on processing and endorsement. Following the example from above, STX 116 may produce a result of <9/2/2017, 2000> (i.e., Sep. 2, 2017 had the most items shipped for the year, 2000 items). Similarly, STX 114 may produce the result <9/8/2018, 4000>, and STX 112 may produce the result <11/20/2019, 3000>.

In some embodiments, after each sub-transaction is endorsed and or processed by the peers, it may be sent back to the client, shown by arrows 122. If the transaction is a query, the process may end. A query is a transaction that may not be recorded as a block on the distributed ledger. If the transaction is to be recorded on the blockchain then the sub-transactions may be forwarded on to block generator 180 (e.g., an ordering service). In some embodiments, the sub-transactions may be combined into a single transaction by the client. In some embodiments, the sub-transactions may be forwarded (depicted by arrows 124) to the block generator for organizing them into a block as shown by the arrows 224. In some embodiments, the block generator may maintain a queue for sub-transactions, and organize them into block(s) only when all the related sub-transactions have arrived. Following the example from above, the result of STX 116 (e.g., <9/2/2017, 2000>) may be compared to the results of STX 114 (e.g., <9/8/2018, 4000>), and STX 112 (e.g., <11/20/2019, 3000>) to determine a final result of <9/8/2018, 4000> since this date had the most items shipped from any of the dates provided in the results of the sub-transactions.

In some embodiments, the sub-transactions (ordered into blocks) may be sent to the blockchain network for validation and recordation, shown by arrow 126. In some embodiments, each sub-transaction may be validated in a similar manner to regular transactions, but if any of the sub-transactions are invalidated, the transaction may be invalidated. For example, if STX 116 and STX 114 are validated, but STX 112 is invalidated, then TX 110 may be invalidated. See FIGS. 4A, 4B, and 5C for details on validation in a blockchain network.

Figure 2:
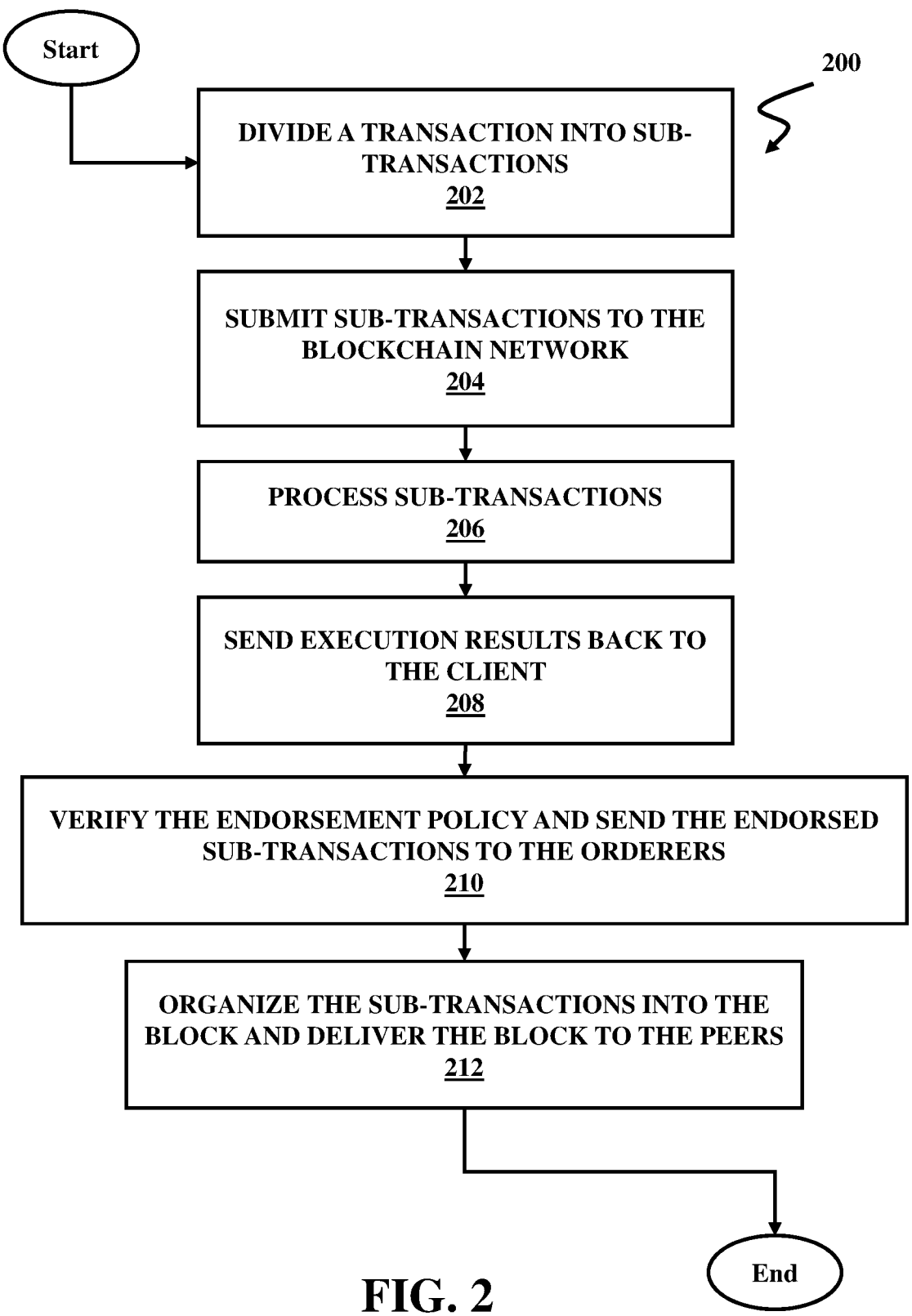
FIG. 2 illustrates a flow diagram of parallel processing of blockchain procedures, according to example embodiments.

Referring now to FIG. 2, illustrated is an example method 200 for parallel processing of blockchain procedures, in accordance with embodiments of the present disclosure.

Method 200 begins with operation 202, where a client divides a transaction into sub-transactions. In some embodiments, a client is a computer that is connected to a blockchain network, able to submit transactions to a node on a blockchain network, and/or a node on the blockchain network. In some embodiments, a transaction is a process that may be submitted to the nodes of a blockchain network. Transactions that are not recorded on the blockchain network are referred to as queries herein. See FIG. 4B for more details on queries.

In some embodiments the dividing may depend on the number of groups available. For example, if a blockchain network has three designated groups then the client may split a transaction into 3 groups. In some embodiments, a cost balance may be used to determine how many sub-transactions a transaction should be split into. For example, if a transaction takes 10 seconds to process, it may be determined that splitting a transaction into 2 sub-transactions may lead to a processing time of 6 seconds for a single peer, and splitting a transaction into 3 sub-transactions may lead to a processing time of 5 seconds. It may be determined that splitting the transaction into 3 sub-transactions is not warranted over splitting the transaction into 2 sub-transactions since it only reduces the processing time by one second. Processing time is used for explanation purposes only, other metrics for measuring the cost of transactions and sub-transactions may be used.

One of the benefits of splitting a transaction into sub-transactions is the decreased processing time for each individual peer. It is expected that some transactions may not warrant splitting. For example, if processing a transaction may take 10 seconds for an individual peer but splitting the transaction into multiple sub-transactions may only reduce the processing time by 1 second, it may be determined that the benefit of reducing the processing time by 1 second does not justify splitting and the splitting of the transaction into sub-transactions may not be performed. Therefore, a processor (e.g., the client) may perform a cost analysis of the splitting. The cost analysis may use a threshold number, such as a threshold savings (e.g., processing time savings, processing power savings, or some other metric). Following the example from above, the threshold might be a savings of 40%, where a splitting a transaction into multiple sub-transactions may have to realize a savings more than 40% of the processing time before it was performed.

In some embodiments, the threshold, or a similar threshold, may also be used to determine how many sub-transactions to split a transaction into. For example, splitting a 10 second transaction into 4 sub-transactions that each take 5 seconds may result in a 50% savings in processing time, exceeding the 40% threshold. However, splitting the transaction into 5 sub-transactions that take 4 seconds of processing time may result in a 20% savings over the 4 sub-transaction group, which does not exceed the threshold. Thus, the transaction may be split into 4 sub-transactions. In some embodiments, when the processor determines that a result of the cost analysis does not exceed a threshold the processor may halt the splitting, and/or elect to send the transaction for processing instead of the sub-transactions based on a determination that the cost analysis exceeds the threshold.

Method 200 continues with operation 204 where the client may submit the sub-transactions to the blockchain network. As stated above, in some embodiments, each transaction may be submitted to a different group of peers. In some embodiments, each group may be comprised of an approximately equivalent group of peers. For example, a first and second group of peers may each be comprised of 100 peers, and a third group may be comprised of 99 peers. In some embodiments, each group may have one or more member nodes from one or more organizations that are deemed essential. As stated above, an essential organization may be determined by one or more rules of the blockchain network or by the client. For example, the client or the blockchain network may deem all organizations that own 10% or more of the peers in the network an essential organization. In some embodiments, all organizations that are part of the blockchain network may be deemed essential.

In operation 206 the processing of the sub-transactions may include the peers endorsing the sub-transactions. In some embodiments, the same endorsement policy is applied to all sub-transactions that belong to the same transaction. An endorsement policy is a condition on what endorses a transaction. Blockchain peers have a pre-specified set of endorsement policies, which are referenced by a deploy transaction that installs specific chaincode. Endorsement policies can be parametrized, and these parameters can be specified by a deploy transaction. See FIG. 4A for detail on processing and endorsement in the peers. Following an example from FIG. 1, STX 116, 114, and 112 may all have the same endorsement policy.

In operation 208, after executing the sub-transactions, the peers may send the results back to the client. For example, each peer may send back an endorsement (or non-endorsement) and/or a result of the sub-transaction the peer was responsible for. In some embodiments, if method 200 were performed on a query, it may end after 208. Query results are not recorded on the blockchain and thus do not need to proceed to the block generator.

In operation 210 the client may inspect/verify the endorsement policy an send the endorsed sub-transactions to the block generator. For example, the client may check the endorsement policy to ensure that the correct allotment of the specified peers have signed the results and authenticated the signatures against the transaction payload. More details on a client inspecting/verifying the endorsement policy are given in FIG. 4B, specifically 492. If the transaction is to be recorded on the blockchain, then the sub-transactions may be forwarded on to a block generator. In some embodiments, the sub-transactions may be combined into a single transaction by the client. In some embodiments, the sub-transactions may be forwarded to the block generator for organizing them into a block. In some embodiments, the block generator may maintain a queue for sub-transactions and organize them into block(s) only when all the related sub-transactions have arrived.

In operation 212, the block generator organizes the sub-transactions into the block(s) and deliver the block(s) to the peers. In some embodiments, the order may maintain a queue of sub-transactions and delay organizing the sub-transactions into block(s) until all sub-transactions for a particular transaction have been received. For example, the queue may have a list of multiple sub-transactions for multiple transactions from multiple clients. If the block generator started organizing sub-transactions for a particular transaction before all the sub-transactions for that particular transaction had been received, the block generator may have to halt the organization and wait for the rest of the sub-transactions for that particular transaction before the block generator may finish.

In some embodiments, the peers may aggregate the sub-transactions in the validation phase, and update the World State, if necessary, by using the aggregated result. In some embodiments, the aggregation results may be derived from comparing the results for the three sub transactions. Following the example from FIG. 1, where the results for the three sub-transactions were <9/2/2017, 2000><9/8/2018, 4000>, <11/20/2019, 3000>, the three sub-transactions may be aggregated to find the final result of <9/8/2018, 4000> for the transaction "which day in year 2017-2019 had the most items shipped?" In this case, the results from each year may be compared to each other to determine which one of the results from the three sub-transactions had the most units shipped. On the date Sep. 8, 2018 4000 items were shipped which is more than the number of items shipped on listed in the answers for 2017 and 2019. In some embodiments, the aggregation may be from combining the results of the sub-transactions. For example, modifying the previous example, for a transaction of "what was the average number of items shipped per day in 2017 and 2018." The transaction may be split into sub-transactions of "what was the average number of items shipped per day in 2017" and "what was the average number of items shipped per day in 2018." If the sub-transaction results came back as an average of 1000 for 2017 and 2000 for 2018 then the results could be aggregated to obtain on overall average of 1500 (e.g. the average of 1000 and 2000) for the average number of items shipped per day in 2017 and 2018. Other methods of aggregation may be possible.

Speaking to validation, in some embodiments, each sub-transaction may be validated in a similar way as normal transactions. However, if one sub-transaction is invalidated, then the original transaction the sub-transactions were derived from may be invalidated since the transaction as a whole cannot be validated. Following the previous example, if the sub-transaction result <9/8/2018, 4000> was invalidated, then the other two sub-transactions may not be aggregated to give an accurate result for the years 2017-2019. Without validated data for 2018 an aggregated result (e.g., the result for the original transaction) cannot be determined. See FIGS. 4A, 4B, and 5C for details on validation in a blockchain network. In some embodiments, the validation of a transaction may be based on the validation of all sub-transactions derived from the transaction.

Figure 3:
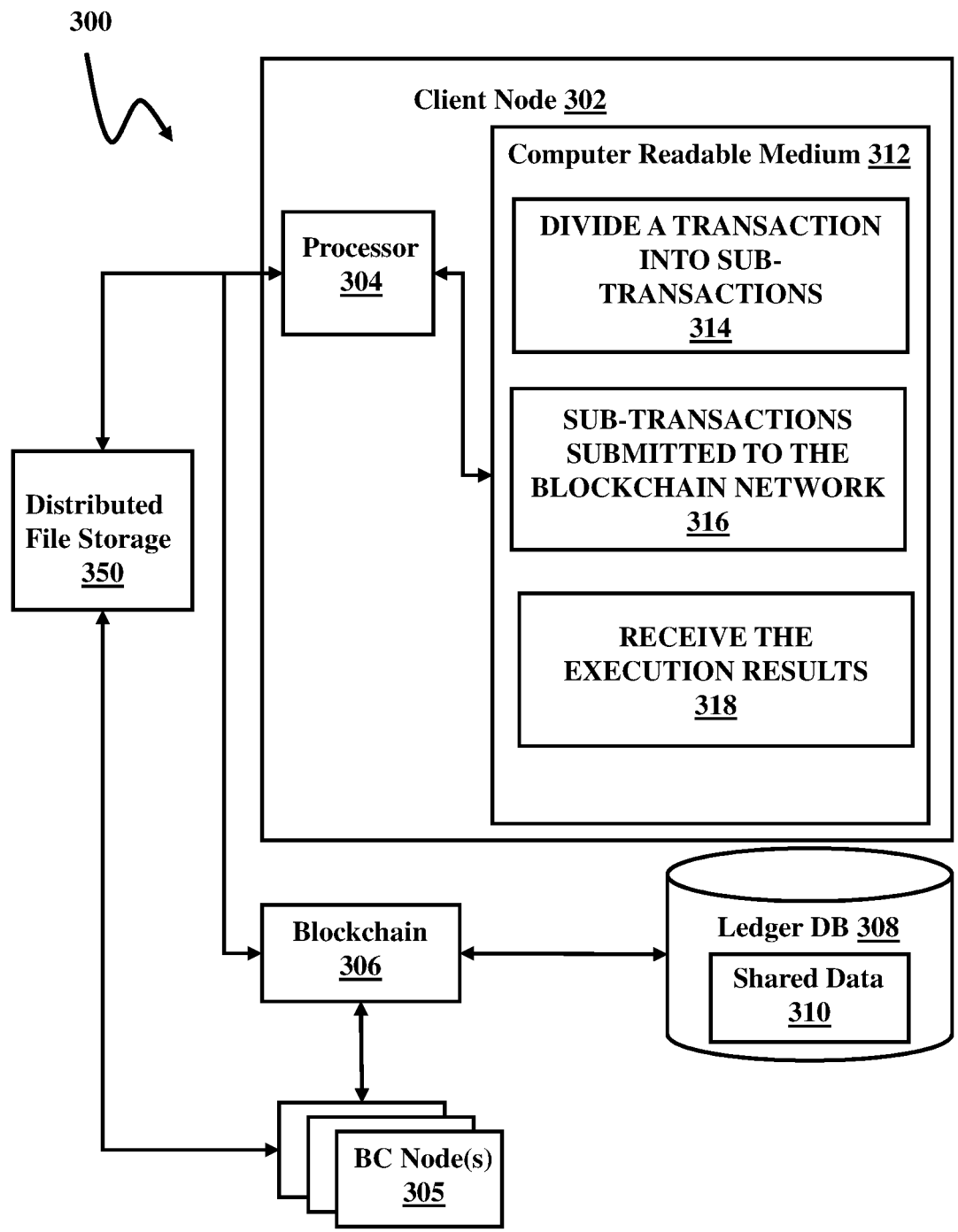
FIG. 3 illustrates a network diagram of a system including a database, according to an example embodiment.

FIG. 3 illustrates a logic network diagram for smart data annotation in blockchain networks, according to example embodiments.

Referring to FIG. 3, the example network 300 includes a client node 302 connected to other blockchain (BC) nodes 305 representing document-owner organizations. The client node 302 may be connected to a blockchain 306 that has a ledger 308 for storing data to be shared among the nodes 305. While this example describes in detail only one client node 302, multiple such nodes may be connected to the blockchain 306. It should be understood that the client node 302 may include additional components and that some of the components described herein may be removed and/or modified without departing from a scope of the client node 302 disclosed herein. The client node 302 may be a computing device or a server computer, or the like, and may include a processor 304, which may be a semiconductor-based microprocessor, a central processing unit (CPU), an application specific integrated circuit (ASIC), a field-programmable gate array (FPGA), and/or another hardware device. Although a single processor 304 is depicted, it should be understood that the client node 302 may include multiple processors, multiple cores, or the like, without departing from the scope of the client node 302 system. A distributed file storage 350 may be accessible to processor node 302 and other BC nodes 305. The distributed file storage may be used to store documents identified in ledger (distributed file storage) 350.

The client node 302 may also include a non-transitory computer readable medium 312 that may have stored thereon machine-readable instructions executable by the processor 304. Examples of the machine-readable instructions are shown as 314-320 and are further discussed below. Examples of the non-transitory computer readable medium 312 may include an electronic, magnetic, optical, or other physical storage device that contains or stores executable instructions. For example, the non-transitory computer readable medium 312 may be a Random Access memory (RAM), an Electrically Erasable Programmable Read-Only Memory (EEPROM), a hard disk, an optical disc, or other type of storage device.

The processor 304 may execute the machine-readable instructions 314 to receive a transaction. As discussed above, the blockchain ledger 308 may store data to be shared among the nodes 305. The blockchain 306 network may be configured to use one or more smart contracts that manage transactions for multiple participating nodes. Documents linked to the annotation information may be stored in distributed file storage 350. The processor 304 may execute the machine-readable instructions 314 to divide a transaction into sub-transactions. The processor 304 may execute the machine-readable instructions 316 to submit the sub-transactions to the blockchain network. The processor 304 may execute the machine-readable instructions 318 to receive the execution results from the peers.

Figure 4A:
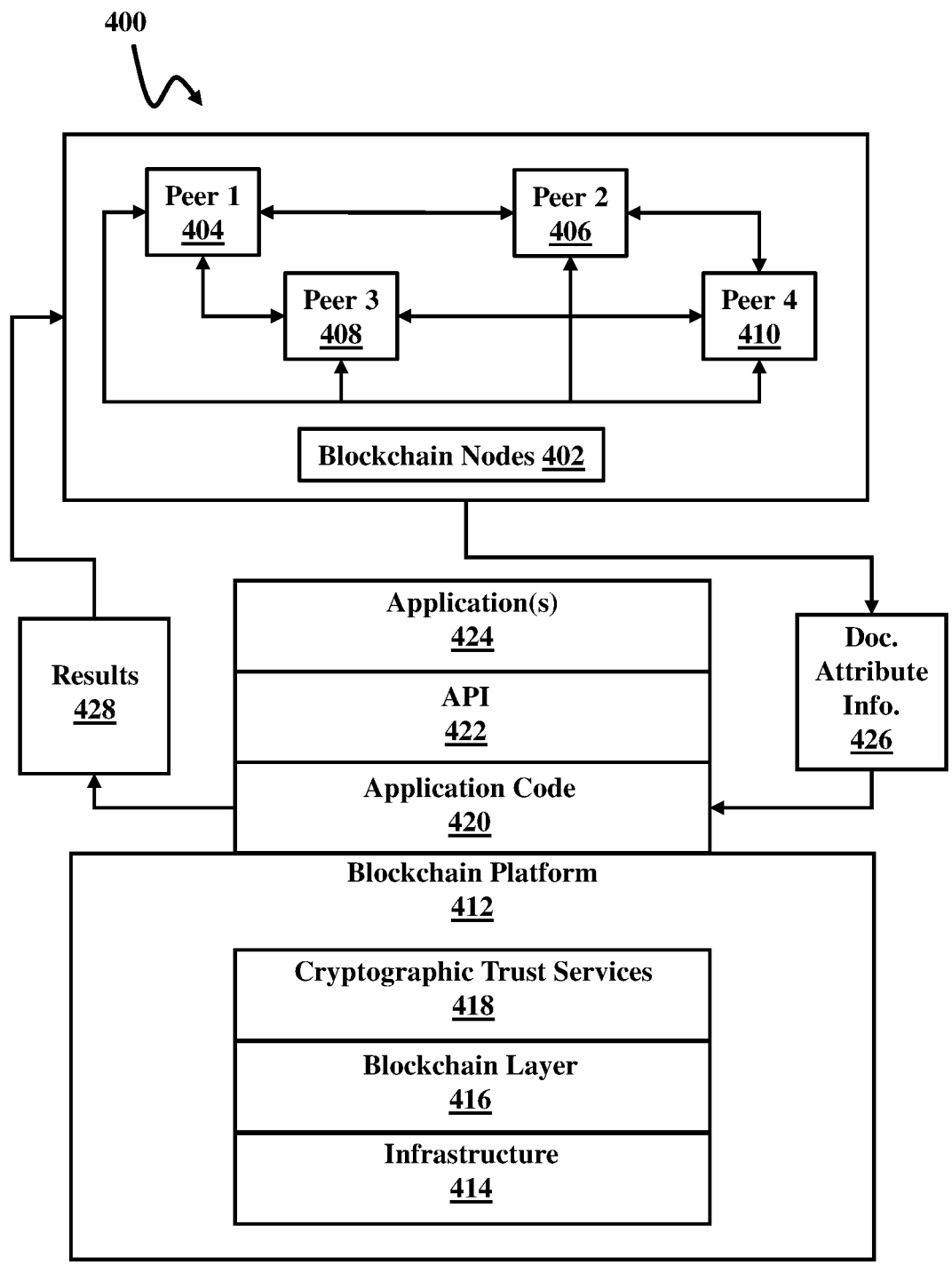
FIG. 4A illustrates an example blockchain architecture configuration, according to example embodiments.

FIG. 4A illustrates a blockchain architecture configuration 400, according to example embodiments. Referring to FIG. 4A, the blockchain architecture 400 may include certain blockchain elements, for example, a group of blockchain nodes 402. The blockchain nodes 402 may include one or more peer nodes 404-410 (these four nodes are depicted by example only). These nodes participate in a number of activities, such as blockchain transaction addition and validation process (consensus). One or more of the blockchain nodes 404-410 may endorse transactions based on endorsement policy and may provide an ordering service for all blockchain nodes in the architecture 400. A blockchain node may initiate a blockchain authentication and seek to write to a blockchain immutable ledger stored in blockchain layer 416, a copy of which may also be stored on the underpinning physical infrastructure 414. The blockchain configuration may include one or more applications 424 which are linked to application programming interfaces (APIs) 422 to access and execute stored program/application code 420 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 404-410.

The blockchain base or platform 412 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 416 may expose an interface that provides access to the virtual execution environment necessary to process the program code and engage the physical infrastructure 414. Cryptographic trust services 418 may be used to verify transactions such as asset exchange transactions and keep information private.

The blockchain architecture configuration of FIG. 4A may process and execute program/application code 420 via one or more interfaces exposed, and services provided, by blockchain platform 412. The code 420 may control blockchain assets. For example, the code 420 can store and transfer data, and may be executed by nodes 404-410 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document attribute(s) information 426 may be processed by one or more processing entities (e.g., virtual machines) included in the blockchain layer 416. The result 428 may include a plurality of linked shared documents. The physical infrastructure 414 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 4B:
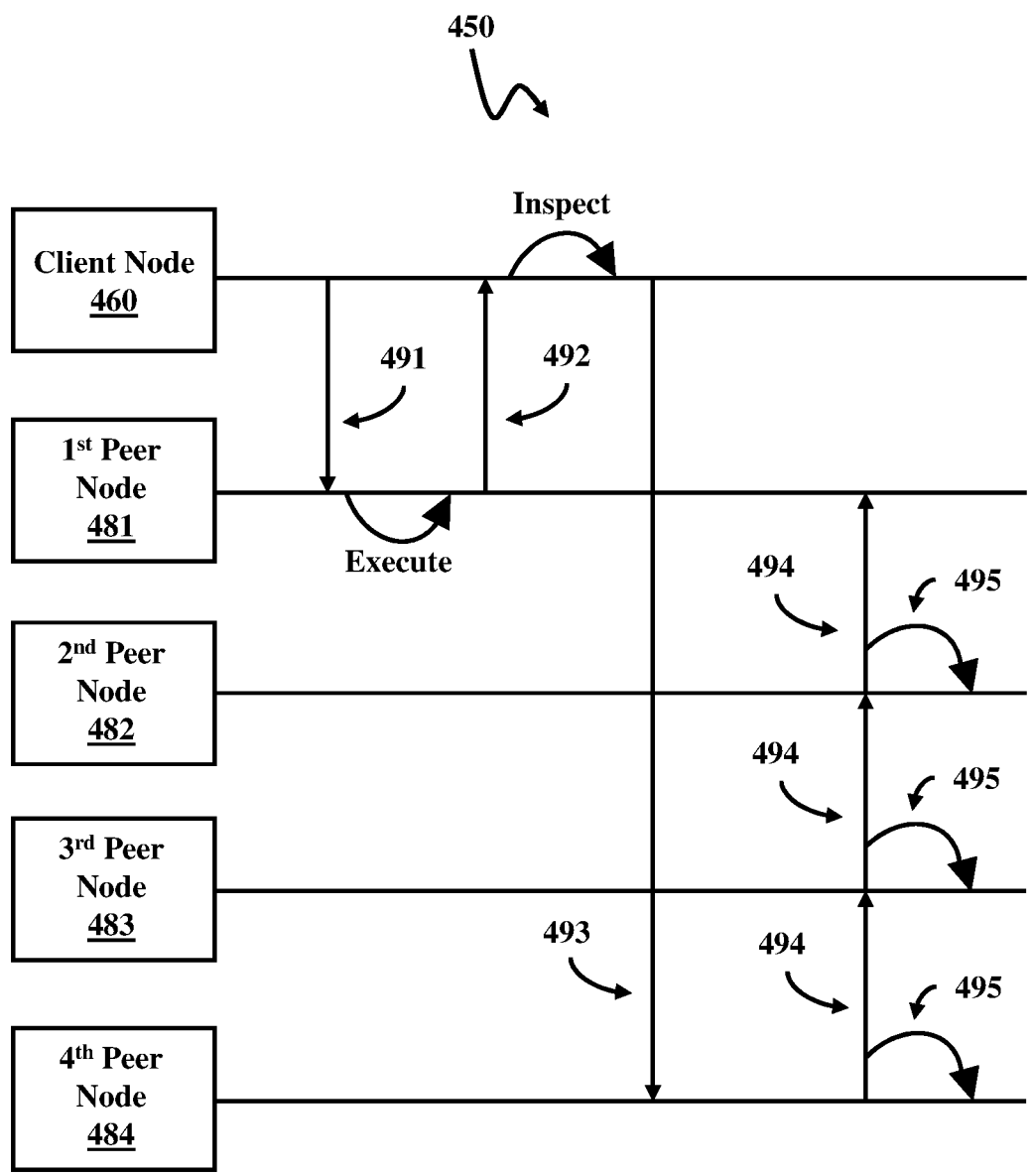
FIG. 4B illustrates a blockchain transactional flow, according to example embodiments.

FIG. 4B illustrates an example of a blockchain transactional flow 450 between nodes of the blockchain in accordance with an example embodiment. Referring to FIG. 4B a general description of transactional flow 450 will be given followed by a more specific example. The transaction flow may include a transaction proposal 491 sent by an application client node 460 to an endorsing peer node 481. The endorsing peer 481 may verify the client signature and execute a chaincode function to initiate the transaction. The output may include the chaincode results, a set of key/value versions that were read in the chaincode (read set), and the set of keys/values that were written in chaincode (write set). The proposal response 492 is sent back to the client 460 along with an endorsement signature, if approved. The client 460 assembles the endorsements into a transaction payload 493 and broadcasts it to an ordering service node 484. The ordering service node 484 then delivers ordered transactions as blocks to all peers 481-483 on a channel. Before committal to the blockchain, each peer 481-483 may validate the transaction. For example, the peers may check the endorsement policy to ensure that the correct allotment of the specified peers have signed the results and authenticated the signatures against the transaction payload 493. In some embodiments, one or more of the peers may be the manager nodes.

A more specific description of transactional flow 450 can be understood with a more specific example. To begin, the client node 460 initiates the transaction 491 by constructing and sending a request to the peer node 481, which is an endorser. The client 460 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 481 may verify (a) that the transaction proposal is well formed, (b) the transaction has not been submitted already in the past (replay-attack protection), (c) the signature is valid, and (d) that the submitter (client 460, in the example) is properly authorized to perform the proposed operation on that channel. The endorsing peer node 481 may take the transaction proposal inputs as arguments to the invoked chaincode function. The chaincode is then executed against a current state database to produce transaction results including a response value, read set, and write set. However, no updates are made to the ledger at this point. In 492, the set of values, along with the endorsing peer node's 481 signature is passed back as a proposal response 492 to the SDK of the client 460 which parses the payload for the application to consume.

In response, the application of the client 460 inspects/verifies the endorsing peers' signatures and compares the proposal responses to determine if the proposal response is the same. If the chaincode only queried the ledger, the application may inspect the query response and may typically not submit the transaction to the ordering service node 484. If the client application intends to submit the transaction to the ordering node service 484 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node may need to endorse the transaction. The architecture is such that even if an application selects not to inspect responses or otherwise forwards an unendorsed transaction, the endorsement policy may still be enforced by peers and upheld at the commit validation phase.

After successful inspection, the client 460 assembles endorsements into a transaction 493 and broadcasts the transaction proposal and response within a transaction message to the ordering node 484. The transaction may contain the read/write sets, the endorsing peers' signatures and a channel ID. The ordering node 484 does not need to inspect the entire content of a transaction in order to perform its operation. Instead, the ordering node 484 may simply receive transactions from all channels in the network, order them chronologically by channel, and create blocks of transactions per channel.

The blocks of the transaction are delivered from the ordering node 484 to all peer nodes 481-483 on the channel. The transactions 494 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 495 each peer node 481-483 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 5A:
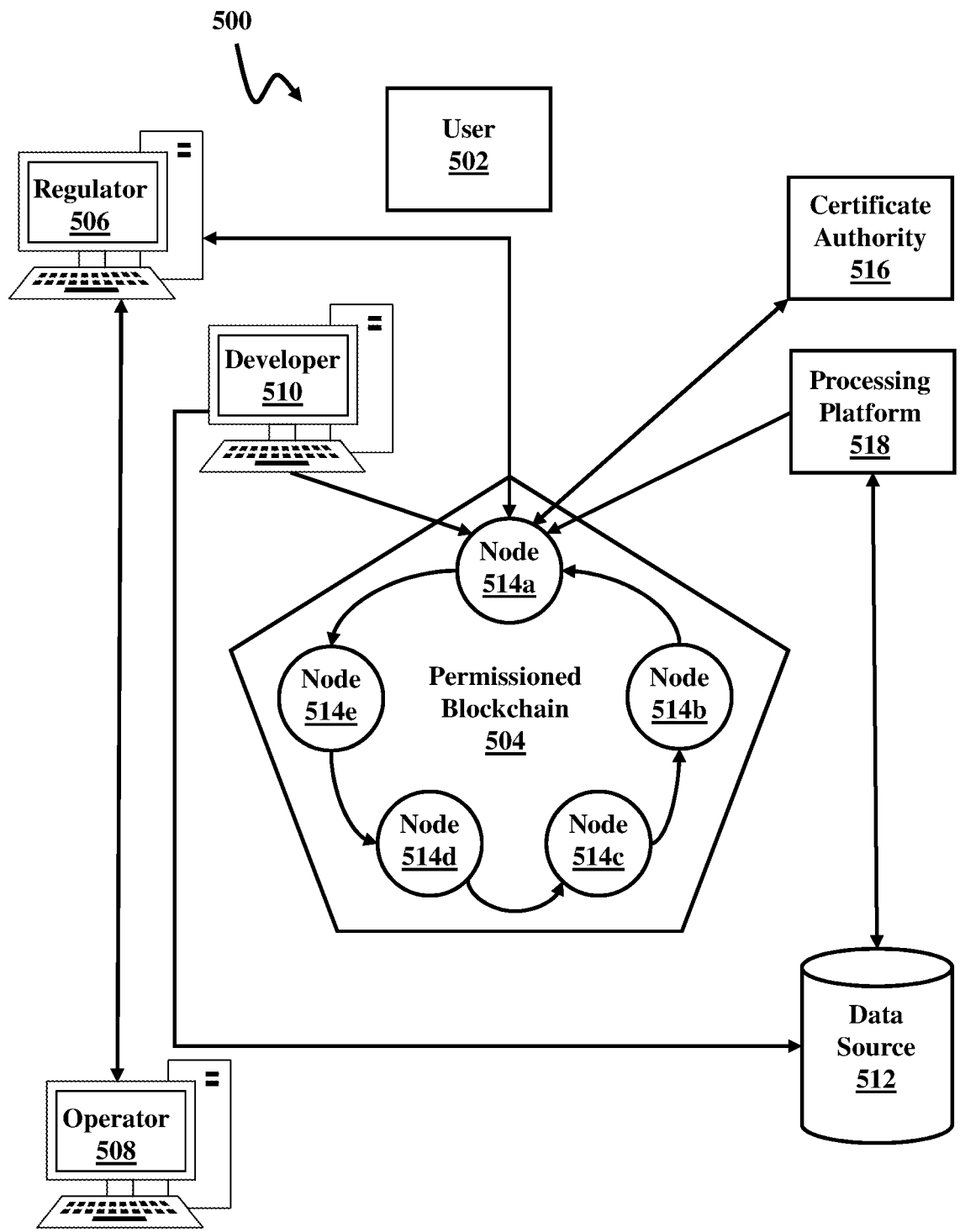
FIG. 5A illustrates a permissioned network, according to example embodiments.

FIG. 5A illustrates an example of a permissioned blockchain network 500, which features a distributed, decentralized peer-to-peer architecture. In this example, a blockchain user 502 may initiate a transaction to the permissioned blockchain 504. In this example, the transaction can be a deploy, invoke, or query, and may be issued through a client-side application leveraging an SDK, directly through an API, etc. Networks may provide access to a regulator 506, such as an auditor. A blockchain network operator 508 manages member permissions, such as enrolling the regulator 506 as an "auditor" and the blockchain user 502 as a "client." An auditor may be restricted only to querying the ledger whereas a client may be authorized to deploy, invoke, and query certain types of chaincode.

A blockchain developer 510 can write chaincode and client-side applications. The blockchain developer 510 can deploy chaincode directly to the network through an interface. To include credentials from a traditional data source 512 in chaincode, the developer 510 may use an out-of-band connection to access the data. In this example, the blockchain user 502 connects to the permissioned blockchain 504 through one of peer nodes 514 (referring to any one of nodes 514a-e). Before proceeding with any transactions, the peer node 514 (e.g., node 514a) retrieves the user's enrollment and transaction certificates from a certificate authority 516, which manages user roles and permissions. In some cases, blockchain users must possess these digital certificates in order to transact on the permissioned blockchain 504. Meanwhile, a user attempting to utilize chaincode may be required to verify their credentials on the traditional data source 512. To confirm the user's authorization, chaincode can use an out-of-band connection to this data through a traditional processing platform 518.

Figure 5B:
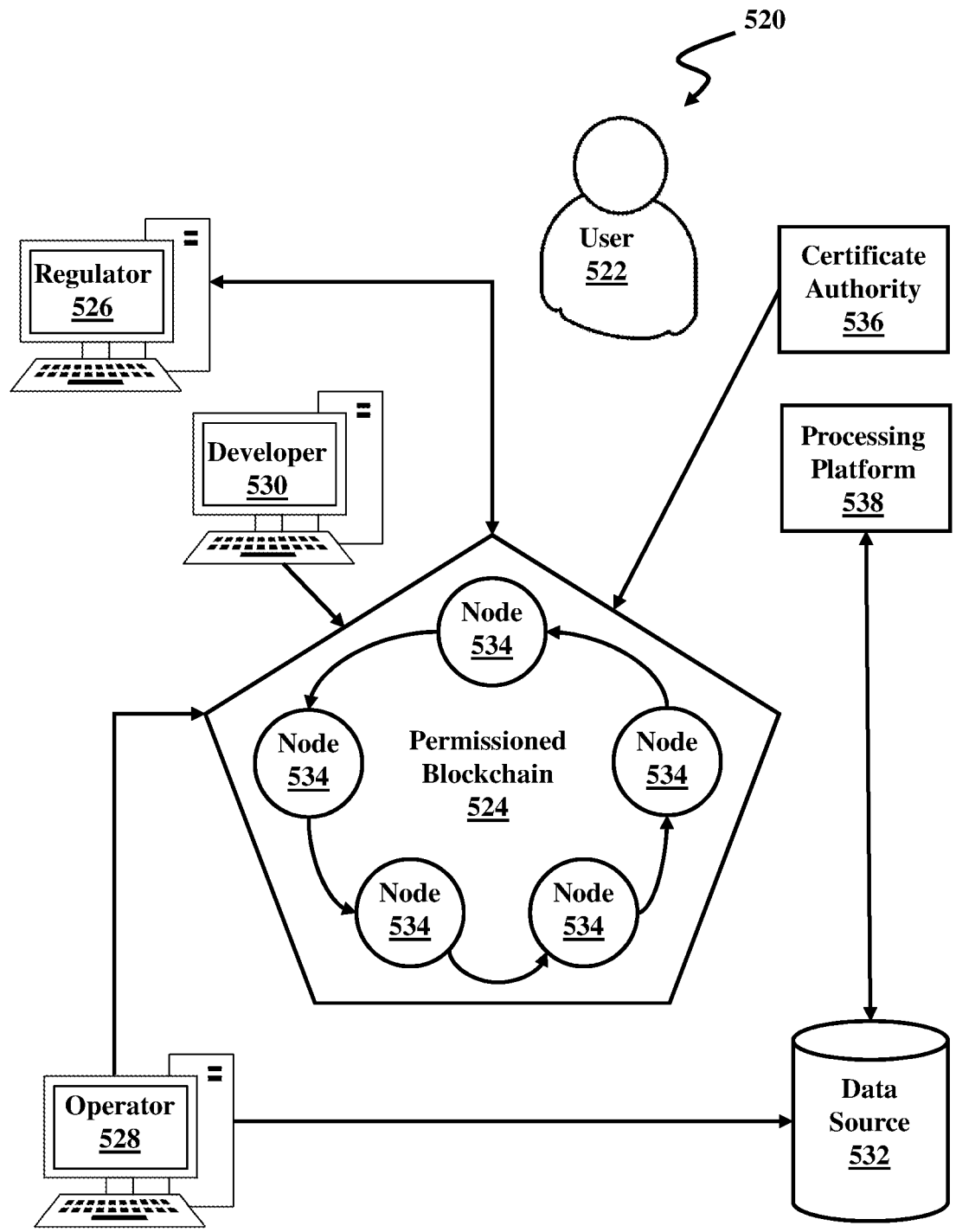
FIG. 5B illustrates another permissioned network, according to example embodiments.

FIG. 5B illustrates another example of a permissioned blockchain network 520, which features a distributed, decentralized peer-to-peer architecture. In this example, a blockchain user 522 may submit a transaction to the permissioned blockchain 524. In this example, the transaction can be a deploy, invoke, or query, and may be issued through a client-side application leveraging an SDK, directly through an API, etc. Networks may provide access to a regulator 526, such as an auditor. A blockchain network operator 528 manages member permissions, such as enrolling the regulator 526 as an "auditor" and the blockchain user 522 as a "client." An auditor may be restricted to only querying the ledger whereas a client may be authorized to deploy, invoke, and query certain types of chaincode.

A blockchain developer 530 writes chaincode and client-side applications. The blockchain developer 530 can deploy chaincode directly to the network through an interface. To include credentials from a traditional data source 532 in chaincode, the developer 530 may use an out-of-band connection to access the data. In this example, the blockchain user 522 connects to the network through a peer node 534. Before proceeding with any transactions, the peer node 534 retrieves the user's enrollment and transaction certificates from the certificate authority 536. In some cases, blockchain users must possess these digital certificates in order to transact on the permissioned blockchain 524. Meanwhile, a user attempting to utilize chaincode may be required to verify their credentials on the traditional data source 532. To confirm the user's authorization, chaincode can use an out-of-band connection to this data through a traditional processing platform 538.

In some embodiments of the present disclosure, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 5C:
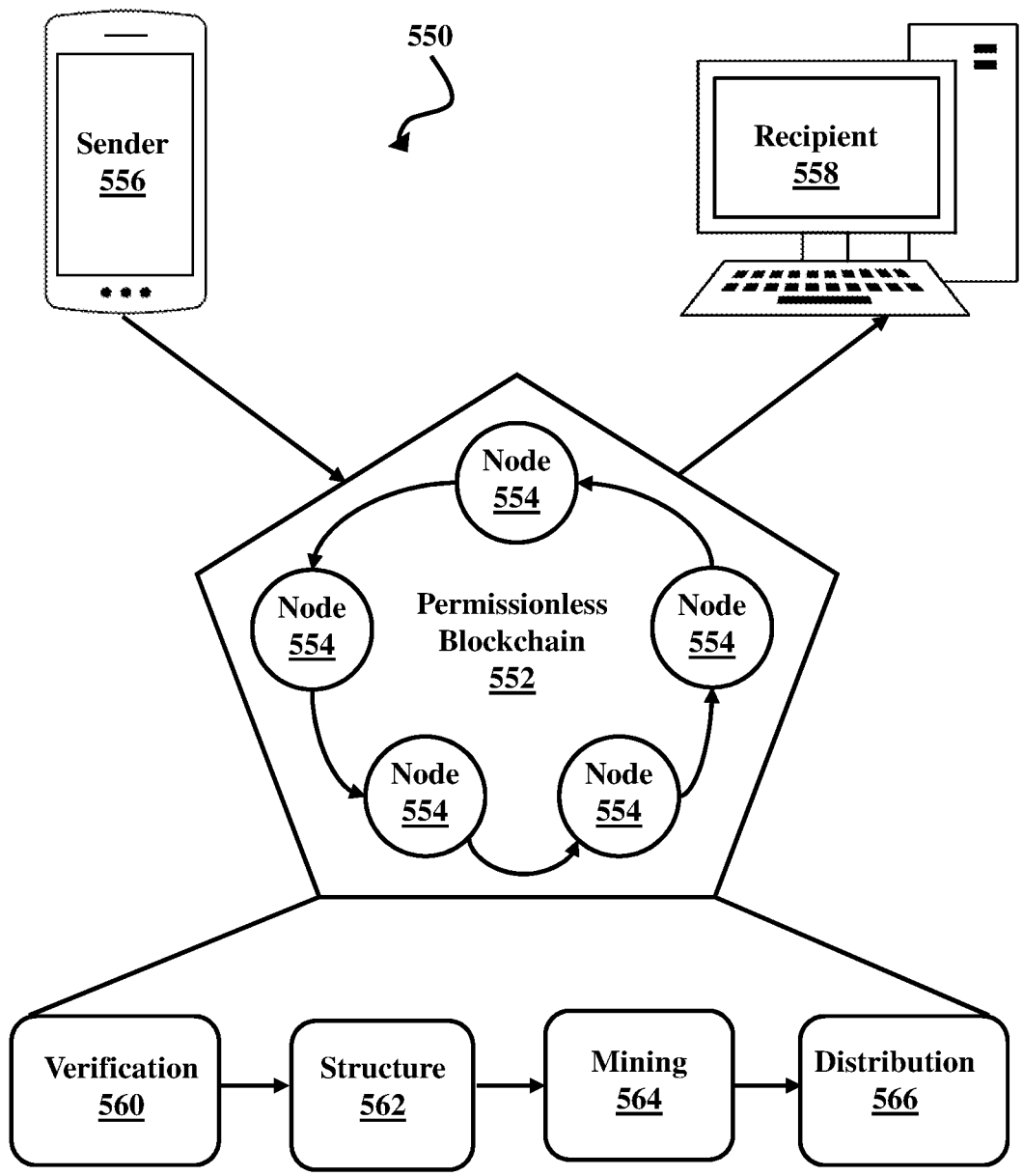
FIG. 5C illustrates a permissionless network, according to example embodiments.

FIG. 5C illustrates a process 550 of a transaction being processed by a permissionless blockchain 552 including a plurality of nodes 554. A sender 556 desires to send payment or some other form of value (e.g., a deed, medical records, a contract, a good, a service, or any other asset that can be encapsulated in a digital record) to a recipient 558 via the permissionless blockchain 552. In some embodiments, each of the sender device 556 and the recipient device 558 may have digital wallets (associated with the blockchain 552) that provide user interface controls and a display of transaction parameters. In response, the transaction is broadcast throughout the blockchain 552 to the nodes 554.

Depending on the blockchain's 552 network parameters the nodes verify 560 the transaction based on rules (which may be pre-defined or dynamically allocated) established by the permissionless blockchain 552 creators. For example, this may include verifying identities of the parties involved, etc. The transaction may be verified immediately, or it may be placed in a queue with other transactions and the nodes 554 determine if the transactions are valid based on a set of network rules.

In structure 562, valid transactions are formed into a block and sealed with a lock (hash). This process may be performed by mining nodes among the nodes 554. Mining nodes may utilize additional software specifically for mining and creating blocks for the permissionless blockchain 552. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 552 may include a proof-of-work (PoW) which is a solution to a puzzle derived from the block's header. Although not shown in the example of FIG. 5C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 564, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 566, the successfully validated block is distributed through the permissionless blockchain 552 and all nodes 554 add the block to a majority chain which is the permissionless blockchain's 552 auditable ledger. Furthermore, the value in the transaction submitted by the sender 556 is deposited or otherwise transferred to the digital wallet of the recipient device 558.

Figure 6A:
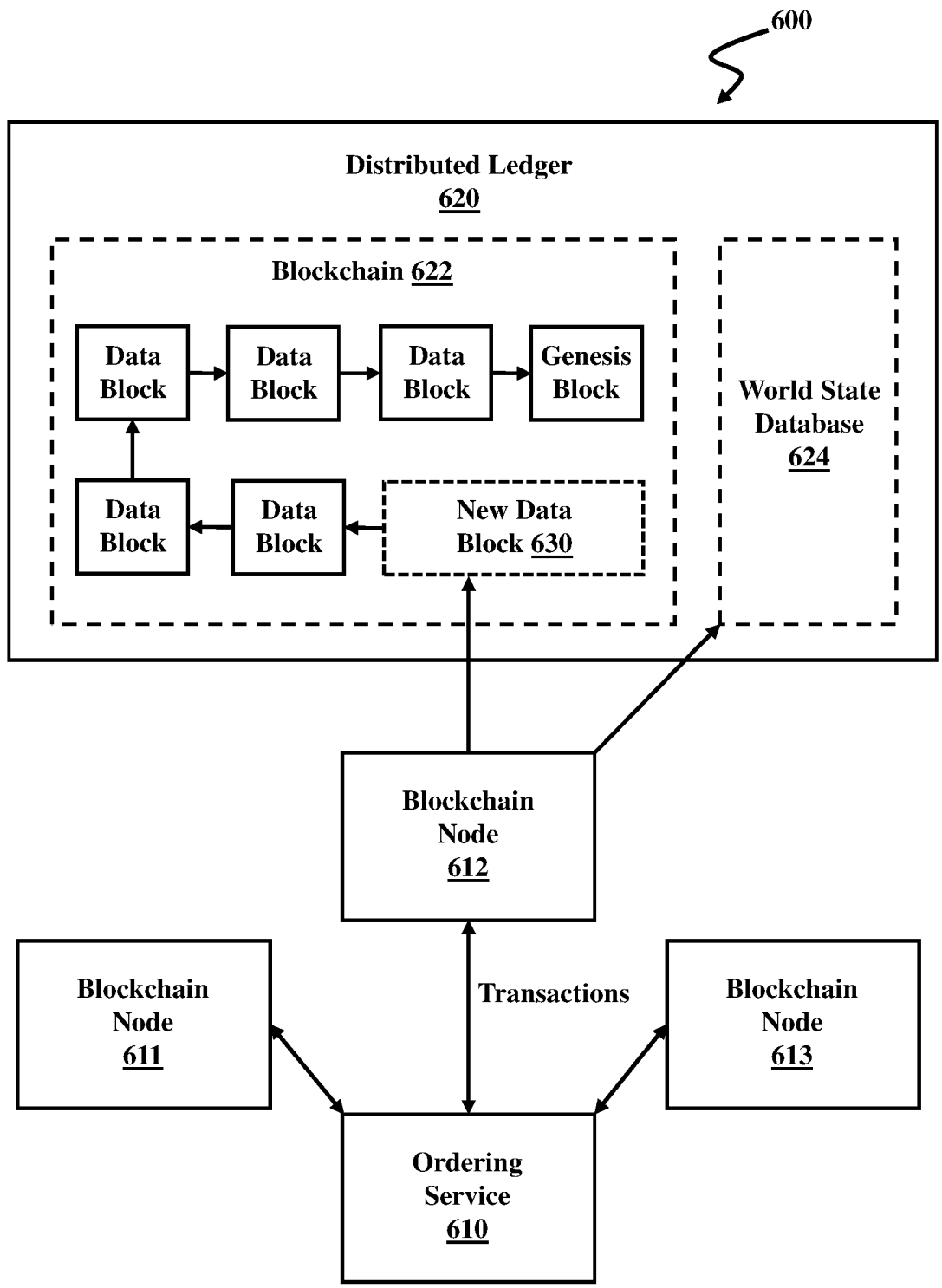
FIG. 6A illustrates a process for a new block being added to a distributed ledger, according to example embodiments.
Figure 6B:
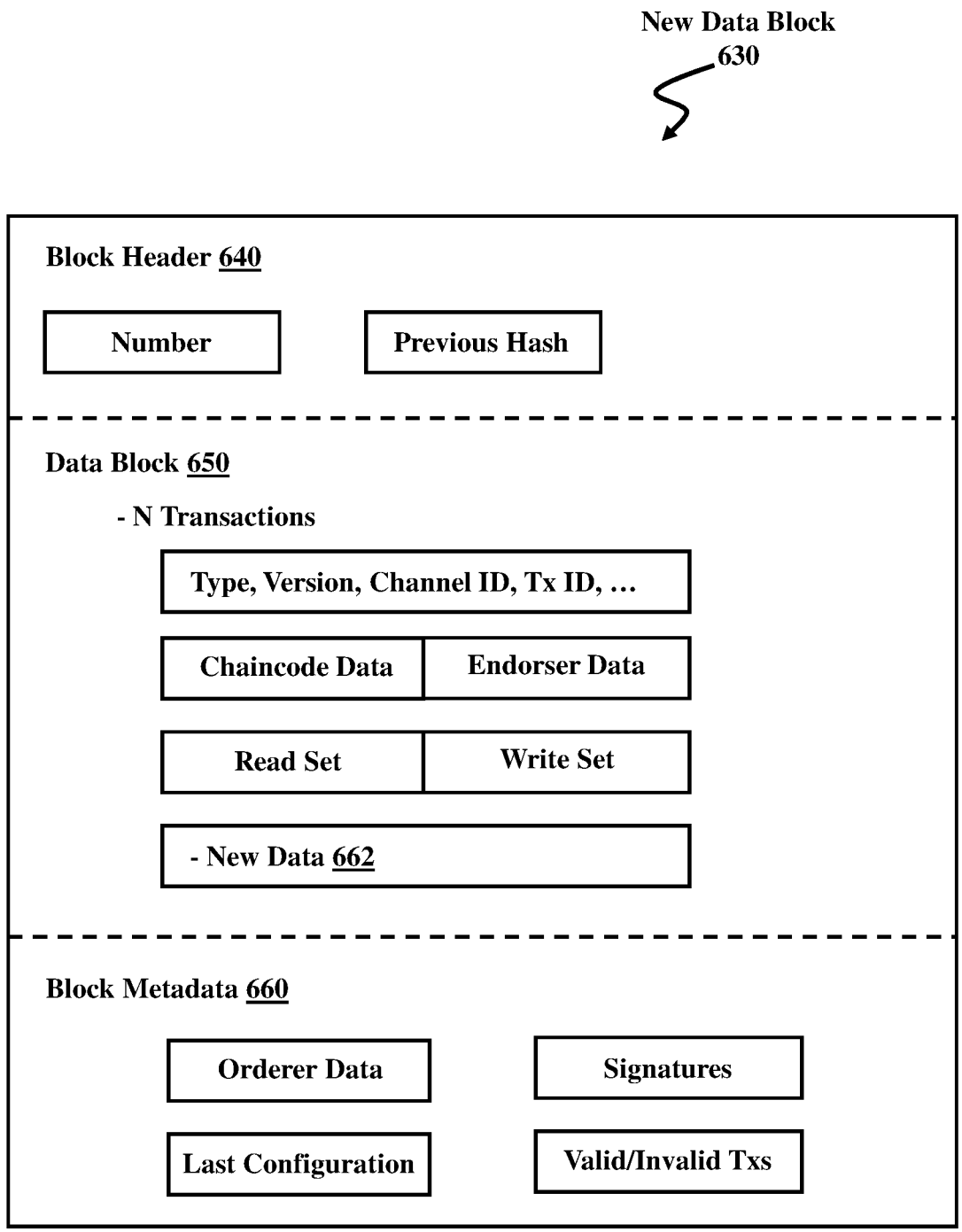
FIG. 6B illustrates contents of a new data block, according to example embodiments.

FIG. 6A illustrates a process 600 of a new block being added to a distributed ledger 620, according to example embodiments, and FIG. 6B illustrates contents of a new data block structure 630 for blockchain, according to example embodiments. The new data block 630 may contain document linking data.

Referring to FIG. 6A, clients (not shown) may submit transactions to blockchain nodes 611, 612, and/or 613. Clients may be instructions received from any source to enact activity on the blockchain 620. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 622 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 620. The first block in the blockchain may be referred to as a genesis block which includes information about the blockchain, its members, the data stored therein, etc.

The ordering service 610 may be made up of a cluster of block generators or orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain system (e.g., Bitcoin, etc.) where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block may still be included in that block, but it may be marked as invalid, and the state database 624 may not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents. Shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650 but may also be located in the block header 640 or the block metadata 660. The new data 662 may include a document composite key that is used for linking the documents within an organization.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the block generator or orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
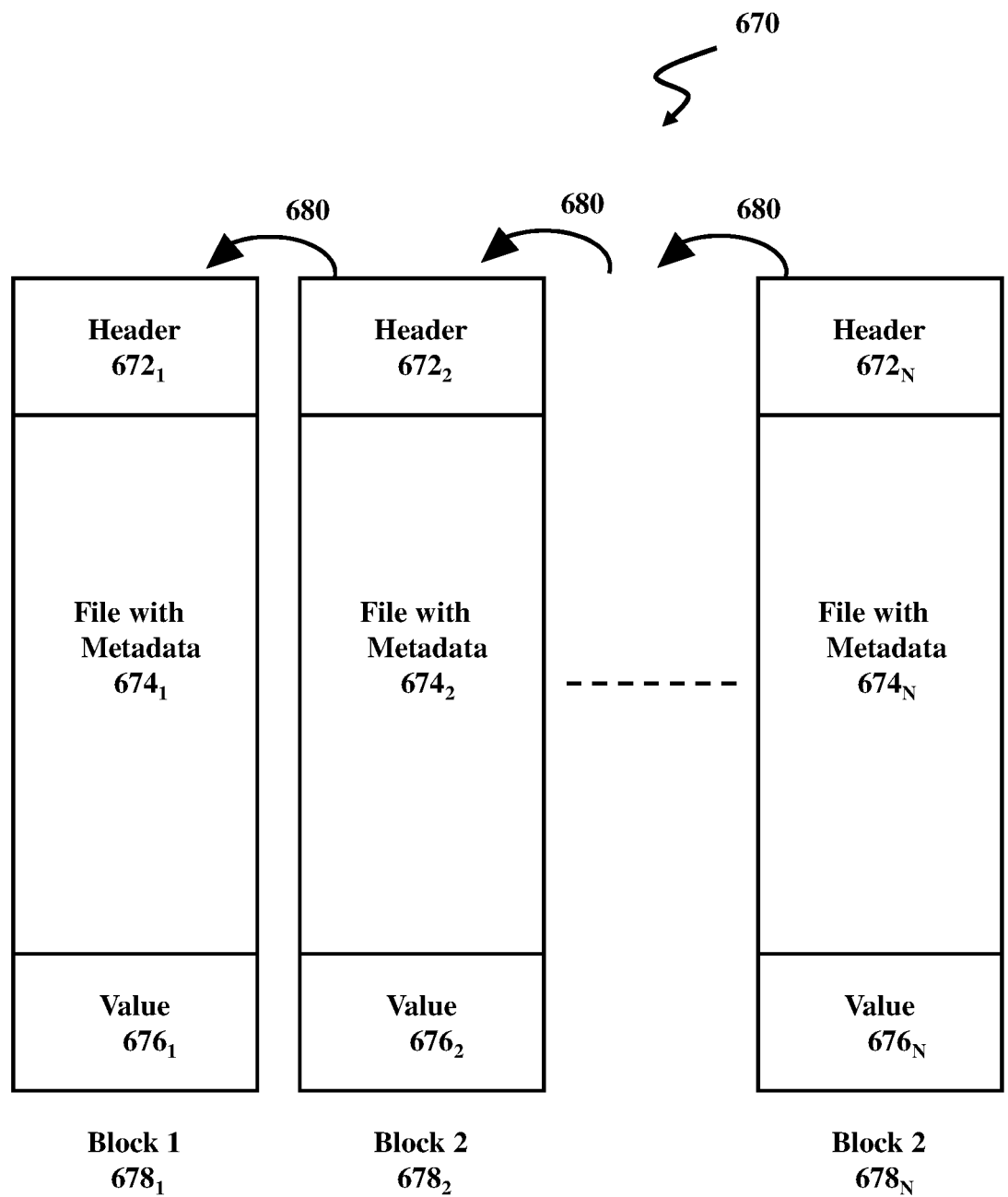
FIG. 6C illustrates a blockchain for digital content, according to example embodiments.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In some embodiments, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In some embodiments, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 6C, the blockchain 670 includes a number of blocks 6781, 6782, . . . 678N cryptographically linked in an ordered sequence, where N>1. The encryption used to link the blocks 6781, 6782, . . . 678N may be any of a number of keyed or un-keyed Hash functions. In some embodiments, the blocks 6781, 6782, . . . 678N are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In other embodiments, the blocks 6781, 6782, . . . , 678N may be cryptographically linked by a function that is different from a hash function. For purposes of illustration, the following description is made with reference to a hash function, e.g., SHA-2.

Each of the blocks 6781, 6782, . . . , 678N in the blockchain includes a header, a version of the file, and a value. The header and the value are different for each block as a result of hashing in the blockchain. In some embodiments, the value may be included in the header. As described in greater detail below, the version of the file may be the original file or a different version of the original file.

The first block 6781 in the blockchain is referred to as the genesis block and includes the header 6721, original file 6741, and an initial value 6761. The hashing scheme used for the genesis block, and indeed in all subsequent blocks, may vary. For example, all the information in the first block 6781 may be hashed together and at one time, or each or a portion of the information in the first block 6781 may be separately hashed and then a hash of the separately hashed portions may be performed.

The header 6721 may include one or more initial parameters, which, for example, may include a version number, timestamp, nonce, root information, difficulty level, consensus protocol, duration, media format, source, descriptive keywords, and/or other information associated with original file 6741 and/or the blockchain. The header 6721 may be generated automatically (e.g., by blockchain network managing software) or manually by a blockchain participant. Unlike the header in other blocks 6782 to 678N in the blockchain, the header 6721 in the genesis block does not reference a previous block, simply because there is no previous block.

The original file 6741 in the genesis block may be, for example, data as captured by a device with or without processing prior to its inclusion in the blockchain. The original file 6741 is received through the interface of the system from the device, media source, or node. The original file 6741 is associated with metadata, which, for example, may be generated by a user, the device, and/or the system processor, either manually or automatically. The metadata may be included in the first block 6781 in association with the original file 6741.

The value 6761 in the genesis block is an initial value generated based on one or more unique attributes of the original file 6741. In some embodiments, the one or more unique attributes may include the hash value for the original file 6741, metadata for the original file 6741, and other information associated with the file. In one implementation, the initial value 6761 may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks 6782 to 678N in the blockchain also have headers, files, and values. However, unlike header 6721 the first block, each of the headers 6722 to 672N in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header 6722 to 672N in the other blocks may also include other information, e.g., version number, timestamp, nonce, root information, difficulty level, consensus protocol, and/or other parameters or information associated with the corresponding files and/or the blockchain in general.

The files 6742 to 674N in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks 6762 to 676N in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file may include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 6D:
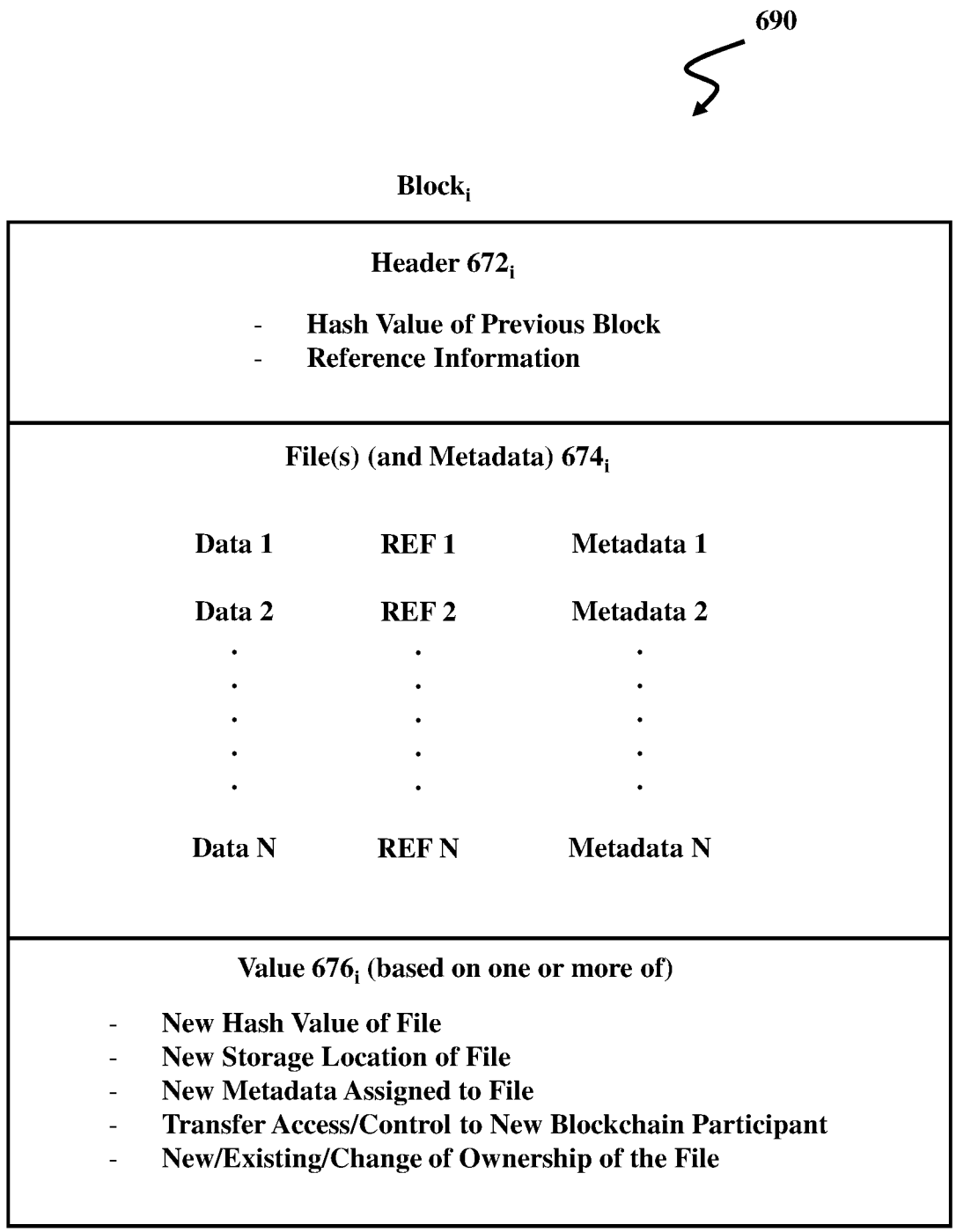
FIG. 6D illustrates a block which may represent the structure of blocks in the blockchain, according to example embodiments.

In some embodiments, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 6D illustrates an embodiment of a block which may represent the structure of the blocks in the blockchain 690 in accordance with one embodiment. The block, Blocki, includes a header 672i, a file 674i, and a value 676i.

The header 672i includes a hash value of a previous block Blocki−1 and additional reference information, which, for example, may be any of the types of information (e.g., header information including references, characteristics, parameters, etc.) discussed herein. All blocks reference the hash of a previous block except, of course, the genesis block.

The hash value of the previous block may be just a hash of the header in the previous block or a hash of all or a portion of the information in the previous block, including the file and metadata.

The file 674i includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , REFN to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value 676i is a hash value or other value computed based on any of the types of information previously discussed. For example, for any given block Blocki, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender may have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7A:
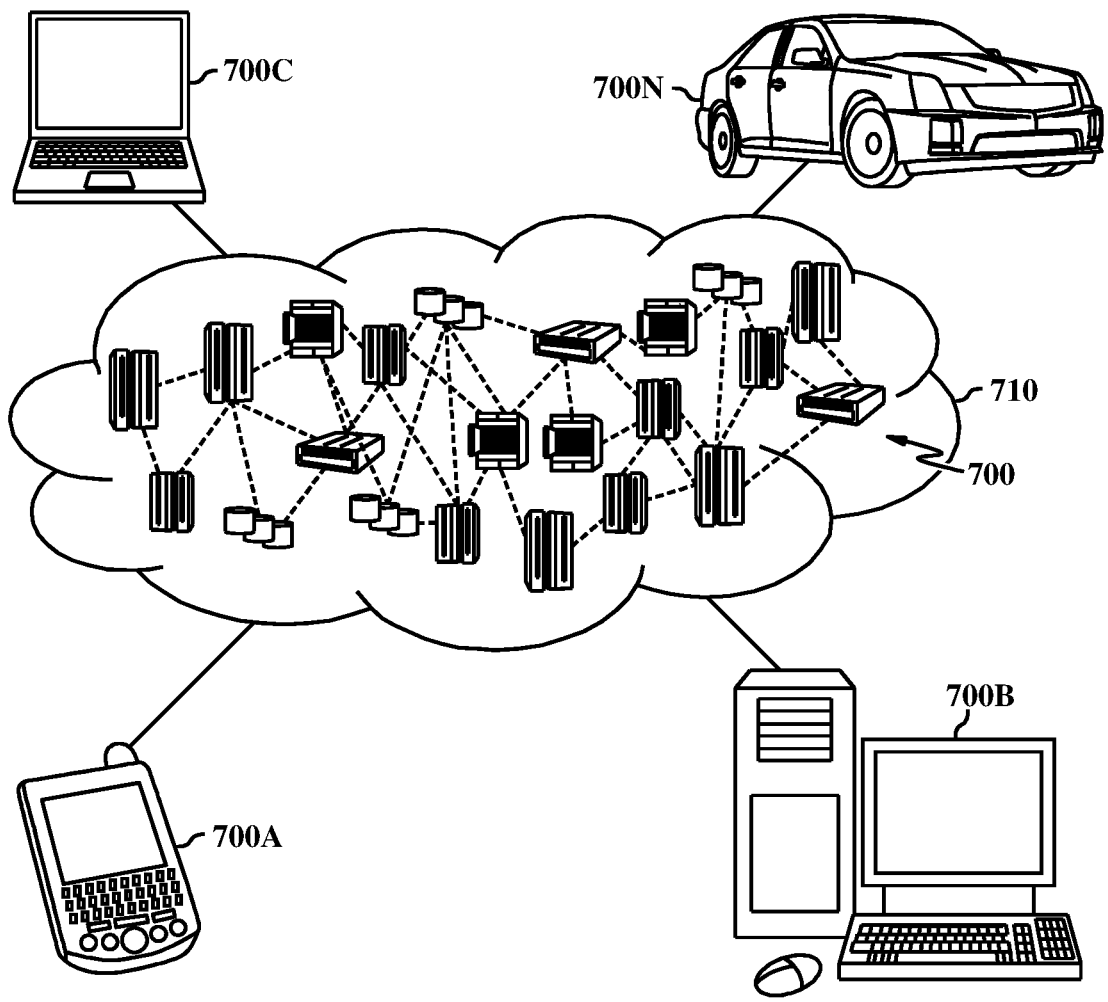
FIG. 7A illustrates a cloud computing environment, in accordance with embodiments of the present disclosure.

FIG. 7A, illustrated is a cloud computing environment 710 is depicted. As shown, cloud computing environment 710 includes one or more cloud computing nodes 700 with which local computing devices used by cloud consumers, such as, for example, personal digital assistant (PDA) or cellular telephone 700A, desktop computer 700B, laptop computer 700C, and/or automobile computer system 700N may communicate. Nodes 700 may communicate with one another. They may be grouped (not shown) physically or virtually, in one or more networks, such as Private, Community, Public, or Hybrid clouds as described hereinabove, or a combination thereof.

This allows cloud computing environment 710 to offer infrastructure, platforms and/or software as services for which a cloud consumer does not need to maintain resources on a local computing device. It is understood that the types of computing devices 700A-N shown in FIG. 7A are intended to be illustrative only and that computing nodes 700 and cloud computing environment 710 can communicate with any type of computerized device over any type of network and/or network addressable connection (e.g., using a web browser).

Figure 7B:
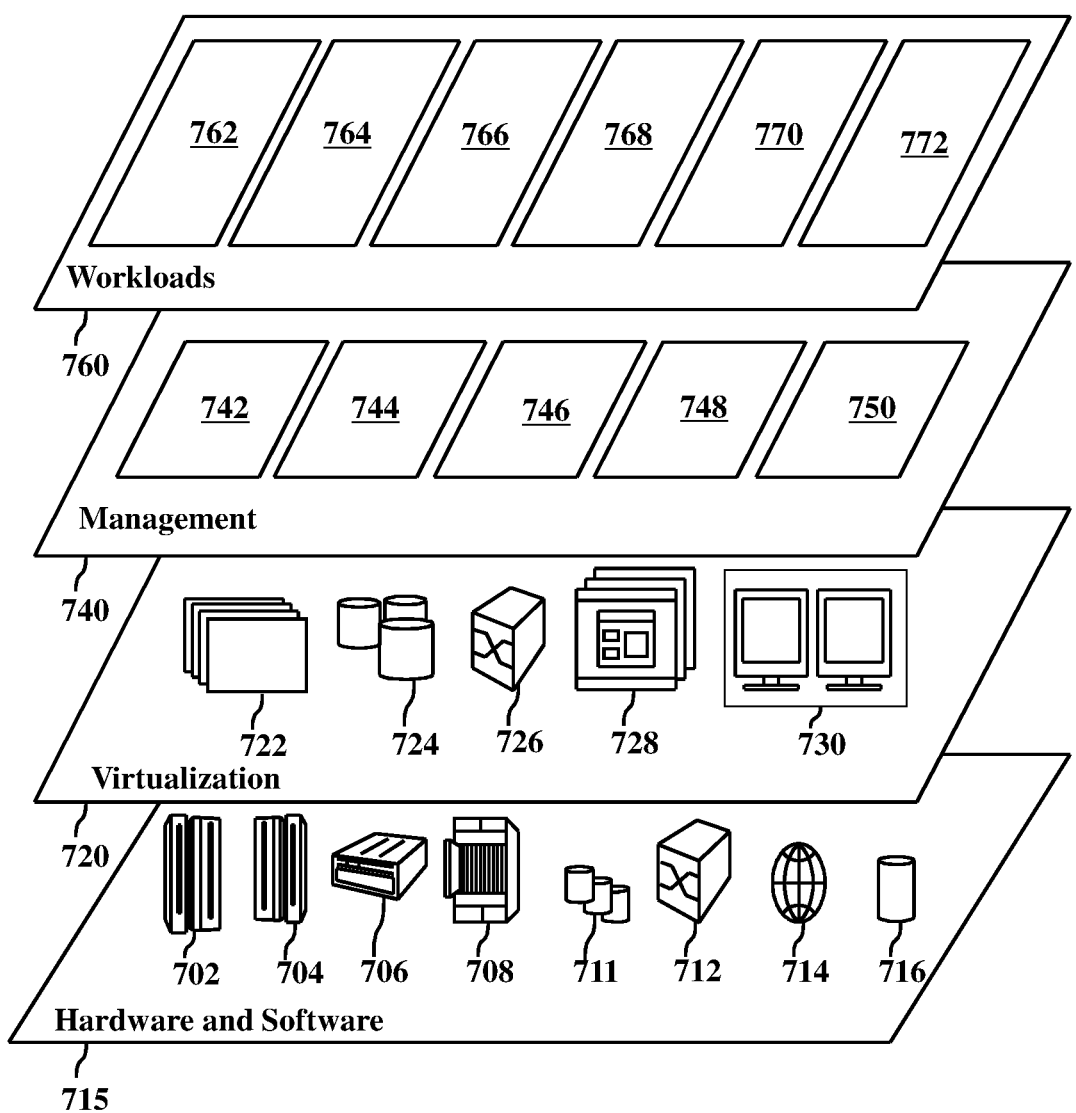
FIG. 7B illustrates abstraction model layers, in accordance with embodiments of the present disclosure.

FIG. 7B, illustrated is a set of functional abstraction layers provided by cloud computing environment 710 (FIG. 7A) is shown. It should be understood in advance that the components, layers, and functions shown in FIG. 7B are intended to be illustrative only and embodiments of the disclosure are not limited thereto. As depicted below, the following layers and corresponding functions are provided.

Hardware and software layer 715 includes hardware and software components. Examples of hardware components include: mainframes 702; RISC (Reduced Instruction Set Computer) architecture based servers 704; servers 706; blade servers 708; storage devices 711; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and atomic committing 772.

Figure 8:
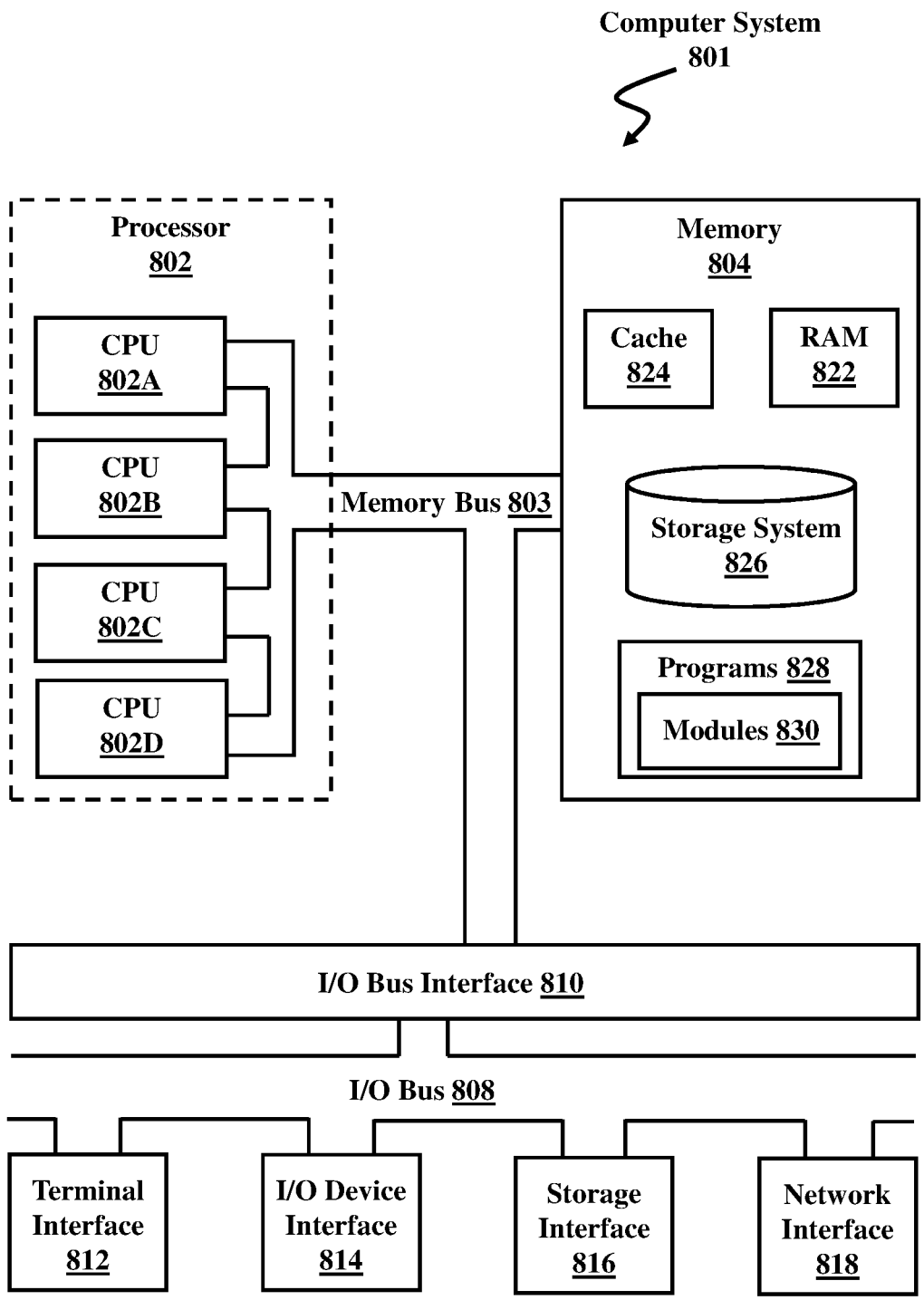
FIG. 8 illustrates a high-level block diagram of an example computer system that may be used in implementing one or more of the methods, tools, and modules, and any related functions, described herein, in accordance with embodiments of the present disclosure.

FIG. 8, illustrated is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random-access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The invention claimed is:

1. A method comprising:
   splitting, by a processor, a transaction into sub-transactions based on a processing time for each sub-transaction;
   sending, by the processor, each sub-transaction to a different group of peers in a blockchain network, wherein each group has at least one peer from each essential organization in the blockchain network; wherein an essential organization is set by the blockchain network as an entity that must participate in a validation of the transaction;
   receiving, by the processor, processed sub-transactions from the peers in the blockchain network, wherein each sub-transaction contains an indication of validation.

2. The method of claim 1 further comprising:
   receiving a validation determination for each sub-transaction; and
   invalidating the transaction based on an invalidation of at least one sub-transactions, wherein all sub-transactions must be valid for the transaction to be valid.

3. The method of claim 2 further comprising:
   emitting an event to notify a client application that the transaction has been immutably appended to the blockchain network.

4. The method of claim 2 further comprising,
   notifying a client application that the transaction was invalidated due to the invalidation of one or more sub-transactions.

5. The method of claim 1 further comprising:
   sending the processed sub-transactions to a block generator for the blockchain network;
   organizing, by the block generator, the processed sub-transactions into blocks; and
   sending, by the block generator, the blocks to the blockchain network.

6. The method of claim 5 further comprising:
   placing, by the block generator the processed sub-transactions into a queue, and
   waiting, by the block generator, to organize until all processed sub-transactions for the transaction are received.

7. The method of claim 1 further comprising:
   determining, by the blockchain network, a validation state for each sub-transaction, wherein if one sub-transaction is invalidated, then the transaction is invalidated.

8. A system comprising:
a processor; and
a memory in communication with the processor, the memory containing program instructions that, when executed by the processor, are configured to cause the processor to perform a method, the method comprising:
split a transaction into two or more sub-transactions;
send each sub-transaction to a different group of peers in a blockchain network, wherein each group has at least one peer from each essential organization in the blockchain network; wherein an essential organization is set by the blockchain network as an entity that must participate in a validation of the transaction; and
receive processed sub-transactions from the peers in the blockchain network.

9. The system of claim 8, the method further comprising:
receiving a validation determination for each sub-transaction; and
invalidating the transaction based on an invalidation of at least one sub-transactions, wherein all sub-transactions must be valid for the transaction to be valid.

10. The system of claim 9, the method further comprising: emitting an event to notify a client application that the transaction has been immutably appended to the blockchain network.

11. The system of claim 9, the method further comprising:
notifying a client application that the transaction was invalidated due to the invalidation of one or more sub-transactions.

12. The system of claim 8, the method further comprising:
send the processed sub-transactions to a block generator for the blockchain network;
organize, by the block generator, the processed sub-transactions into blocks; and
send, by the block generator, the blocks to the blockchain network.

13. The system of claim 12, the method further comprising:
place, by the block generator the processed sub-transactions into a queue, and
wait, by the block generator, to organize until all processed sub-transactions for the transaction are received.

14. The system of claim 8, the method further comprising:
determine, by the blockchain network, a validation state for each sub-transaction, wherein if one sub-transaction is invalidated, then the transaction is invalidated.

15. A computer program product comprising a computer readable storage medium having program instructions embodied therewith, the program instructions executable with a processor, in a node of a blockchain network, to cause the processors to perform a function, the function comprising:
splitting, by the processor, a transaction into sub-transactions;
sending, by the processor, each sub-transaction to a different group of peers in a blockchain network, wherein each group has at least one peer from each essential organization in the blockchain network; wherein an essential organization is set by the blockchain network as an entity that must participate in a validation of the transaction; and
receiving, by the processor, processed sub-transactions from the peers in the blockchain network.

16. The computer program product of claim 15 further comprising:
receiving a validation determination for each sub-transaction; and
invalidating the transaction based on invalidation of at least one sub-transactions, wherein all sub-transactions must be valid for the transaction to be valid.

17. The computer program product of claim 16 further comprising:
emitting an event to notify a client application that the transaction has been immutably appended to the blockchain network.

18. The computer program product of claim 16 further comprising:
notifying a client application that the transaction was invalidated due to the invalidation of one or more sub-transactions.

19. The computer program product of claim 15 further comprising:
sending the processed sub-transactions to a block generator for the blockchain network;
organizing, by the block generator, the processed sub-transactions into blocks; and
sending, by the block generator, the blocks to the blockchain network.

20. The computer program product of claim 19 further comprising:
placing, by the block generator the processed sub-transactions into a queue, and
waiting, by the block generator, to organize until all processed sub-transactions for the transaction are received.

* * * * *